United States Patent
Kang et al.

(10) Patent No.: US 11,933,944 B2
(45) Date of Patent: Mar. 19, 2024

(54) MICROLENS PROVIDED WITH OPPOSITE SIDES THEREOF EACH HAVING ASPHERIC-SURFACE SHAPE

(71) Applicant: MPNICS CO., LTD., Gwangju (KR)

(72) Inventors: Sang Do Kang, Gwangju (KR); Seung Keun Oh, Gwangju (KR)

(73) Assignee: MPNICS CO., LTD., Gwangju (KR)

( * ) Notice: Subject to any disclaimer, the term of this patent is extended or adjusted under 35 U.S.C. 154(b) by 292 days.

(21) Appl. No.: 17/346,979

(22) Filed: Jun. 14, 2021

(65) Prior Publication Data

US 2022/0179170 A1    Jun. 9, 2022

(30) Foreign Application Priority Data

Dec. 9, 2020   (KR) .................. 10-2020-0171643

(51) Int. Cl.
G02B 13/00    (2006.01)
H04B 10/572   (2013.01)

(52) U.S. Cl.
CPC ......... *G02B 13/002* (2013.01); *H04B 10/572* (2013.01)

(58) Field of Classification Search
CPC .............. G02B 13/002; G02B 27/1006; G02B 13/003; G02B 13/0035; G02B 13/004; G02B 13/0045; G02B 13/005; G02B 27/144; G02B 13/18; G02B 13/14; G02B 13/0015; G02B 13/001; H04B 10/572; H04B 10/501; H04J 14/02
See application file for complete search history.

(56) References Cited

U.S. PATENT DOCUMENTS

| | | | | |
|---|---|---|---|---|
| 7,505,650 B1 * | 3/2009 | Grzybowski | ........... | C03B 23/02 65/106 |
| 10,451,246 B2 * | 10/2019 | Piehler | ............... | G02B 19/0014 |
| 11,614,590 B2 * | 3/2023 | Kang | ................... | G02B 6/4206 385/33 |
| 11,796,720 B2 * | 10/2023 | Tillkorn | ................... | G02B 3/04 |
| 2013/0314777 A1 * | 11/2013 | Dohi | ...................... | G02B 27/30 359/385 |
| 2015/0234155 A1 * | 8/2015 | Lin | ...................... | G02B 13/003 359/622 |

FOREIGN PATENT DOCUMENTS

| | | |
|---|---|---|
| JP | 2013-246255 A | 12/2013 |
| KR | 10-2009-0029565 A | 3/2009 |
| KR | 10-2011-0026368 A | 3/2011 |

OTHER PUBLICATIONS

Office action dated Jul. 6, 2022 from Korean Patent Office in a counterpart Korean Patent Application No. 10-2020-0171643 (all the cited references are listed in this IDS.) (English translation is also submitted herewith.).

* cited by examiner

*Primary Examiner* — Hibret A Woldekidan
(74) *Attorney, Agent, or Firm* — The PL Law Group, PLLC

(57) ABSTRACT

A microlens is provided with opposite sides thereof each having an aspheric-surface shape. The microlens is configured such that a lens layer having an aspheric-surface shape is provided on each opposite side of the microlens, an optical communication module may be miniaturized and integrated as a working distance (WD) is minimized to 0.160±0.05 mm, and collimating performance is excellent as a value obtained by calculating a paraxial radius (R1) of a first lens layer over a paraxial radius (R2) of a second lens layer is 1.8 to 3.5.

5 Claims, 7 Drawing Sheets

FIG. 4

| material (material) | refractive index (n) | working distance (WD; mm) | curvature radius of first lens (R1) | curvature radius of second lens (R2) | curvature radius ratio R1/R2 | divergence angle (Divergence angle; mrad) |
|---|---|---|---|---|---|---|
| K-BK7(SUMITA) | 1.51633 | 0.160 | 0.521 | 0.328 | 1.59 | 1.408 |
| K-VC78(SUMITA) | 1.66955 | | 0.806 | 0.395 | 2.04 | 0.774 |
| K-VC82(SUMITA) | 1.756 | | 0.780 | 0.432 | 1.81 | 0.414 |
| K-LAFK50(SUMITA) | 1.772 | | 0.833 | 0.439 | 1.90 | 0.344 |
| K-VC89(SUMITA) | 1.810 | | 0.918 | 0.451 | 2.04 | 0.324 |
| L-TIH53(OHARA) | 1.847 | | 1.000 | 0.458 | 2.19 | 0.304 |
| K-VC90(SUMITA) | 1.853 | | 1.267 | 0.462 | 2.74 | 0.322 |
| L-LAH83(OHARA) | 1.864 | | 1.595 | 0.463 | 3.45 | 0.334 |

FIG. 6

| wavelength (WL; nm) | K-VC89 (SUMITA) refractive index: 1.810 | K-BK7 (SUMITA) refractive index: 1.516 | K-VC78 (SUMITA) refractive index: 1.670 | K-VC82 (SUMITA) refractive index: 1.756 | K-LAFK50 (SUMITA) refractive index: 1.772 | L-TIH53 (OHARA) refractive index: 1.847 | K-VC90 (SUMITA) refractive index: 1.853 | L-LAH83 (OHARA) refractive index: 1.864 |
|---|---|---|---|---|---|---|---|---|
| 850  | 1.024 | 1.238 | 0.796 | 1.376 | 0.828 | 1.170 | 1.044 | 0.858 |
| 1100 | 0.622 | 1.310 | 0.542 | 0.918 | 0.738 | 0.822 | 0.524 | 0.628 |
| 1290 | 0.600 | 1.448 | 0.534 | 0.716 | 0.482 | 0.482 | 0.508 | 0.480 |
| 1335 | 0.510 | 1.472 | 0.662 | 0.770 | 0.454 | 0.428 | 0.428 | 0.408 |
| 1380 | 0.432 | 1.496 | 0.606 | 0.610 | 0.434 | 0.406 | 0.364 | 0.352 |
| 1425 | 0.364 | 1.526 | 0.726 | 0.456 | 0.422 | 0.408 | 0.310 | 0.306 |
| 1470 | 0.358 | 1.332 | 0.672 | 0.532 | 0.414 | 0.430 | 0.446 | 0.450 |
| 1515 | 0.338 | 1.380 | 0.796 | 0.382 | 0.408 | 0.286 | 0.408 | 0.418 |
| 1550 | 0.324 | 1.408 | 0.774 | 0.414 | 0.344 | 0.304 | 0.322 | 0.334 |
| 1610 | 0.250 | 1.398 | 0.780 | 0.430 | 0.336 | 0.322 | 0.276 | 0.296 | divergent angle (Divergence angle: mrad)

MICROLENS PROVIDED WITH OPPOSITE SIDES THEREOF EACH HAVING ASPHERIC-SURFACE SHAPE

CROSS REFERENCE TO RELATED APPLICATION

The present application claims priority to Korean Patent Application No. 10-2020-0171643, filed Dec. 9, 2020, the entire contents of which is incorporated herein for all purposes by this reference.

BACKGROUND

1. Field of the Invention

The present invention relates to a microlens and, more particularly, to a microlens provided with opposite sides thereof each having an aspheric-surface shape, wherein a lens layer having an aspheric-surface shape is provided on each opposite side of the microlens, an optical communication module may be miniaturized and integrated as a working distance WD is minimized to 0.160±0.05 mm, and collimating performance is excellent as a value obtained by calculating a curvature radius R1 of a first lens layer over a curvature radius R2 of a second lens layer is 1.8 to 3.5.

2. Description of the Related Art

In general, optical communication modules widely use a method of transmitting optical signals of different wavelengths through a single optical fiber by using wavelength division multiplexing (WDM) in order to increase transmission capacity.

FIG. 1 is a view showing an optical communication module to which a conventional microlens is applied.

Referring to FIG. 1, a conventional optical communication module 10 includes: a light source 11; a plurality of microlenses for functioning as collimating lenses; a filter 13 for selectively transmitting only a specific wavelength of a beam incident through the microlenses; an optical block 14 for reflecting beams of different wavelengths λ1, λ2, λ3, and λ4 incident through the filter 13 to be merged with each other; and a microlens 15 for functioning as a focusing lens that receives the merged multi-wavelength beams to be focused into a fiber 16.

Meanwhile, FIG. 2 is a view showing a beam divergence angle of the microlens 12, and referring to FIG. 2, the beam divergence angle refers to an angle θ2 formed by a line L1 parallel to an optical axis and a diffusion line L2 of a beam.

In the conventional optical communication module 10, a beam path of a first wavelength λ1 is about 80 mm, and a beam path of a fourth wavelength λ4 is about 200 mm, and in order to reduce light loss and achieve high performance, a divergence angle of collimation beam should be small.

In more detail, when a beam path is 140 mm or more as a result of module simulation of a lens designed with a beam divergence angle of 1 mrad or more, loss of optical signals occurs, so it is confirmed that performance drops sharply to 60% or less, and thus in order to exhibit more than 90% performance even when the beam path is 200 mm, there is a need to develop a microlens with the beam divergence angle of 1 mrad or less.

In addition, with the development of an optical communication industry, in order to miniaturize and integrate optical communication modules, it is necessary to develop a microlens that satisfies the beam divergence angle of 1 mrad or less, while minimizing the working distance WD, which is a distance between the microlens and a light source.

SUMMARY

The present invention has been devised to solve the above-described problems, and an objective of the present invention is to provide a microlens provided with opposite sides thereof each having an aspheric-surface shape, wherein a lens layer having an aspheric-surface shape is provided on each opposite side of the microlens, an optical communication module may be miniaturized and integrated as a working distance WD is minimized, and collimating performance is excellent as a beam divergence angle is 1 mrad or less.

The objective of the present invention is not limited to the objective mentioned above, and other objectives not mentioned herein will be clearly understood from the following description.

In order to achieve the above-described objective, the present invention provides a microlens provided with opposite sides thereof each having an aspheric-surface shape, the microlens including: a first lens layer having the aspheric-surface shape provided on a first side thereof; and a second lens layer having the aspheric-surface shape provided on a second side thereof, wherein a working distance WD is 0.160±0.05 mm, and a beam divergence angle is less than 1 mrad by satisfying Equation 1, which is R1/R2=1.8 to 3.5, where R1 is a curvature radius of the first lens layer, and R2 is a curvature radius of the second lens layer.

In the preferred exemplary embodiment, the microlens may have a refractive index Nd of 1.60 to 1.86.

In the preferred exemplary embodiment, the microlens may be used in a wavelength range of 1290 nm to 1610 nm.

In the preferred exemplary embodiment, the microlens may have a numerical aperture object NAO of 0.50 or less.

In the preferred exemplary embodiment, the microlens may have a thickness D of 0.680 mm to 0.720 mm, and a beam diameter BD of 0.50 mm or less.

In addition, the present invention further provides an optical communication module, including: a light source; a first microlens of any one of claims 1 to 5, the first microlens functioning as a collimating lens; a filter for selectively transmitting only a specific wavelength of a beam incident through the first microlens; an optical block for reflecting beams having different wavelengths incident through the filter to be merged with each other; and a second microlens for functioning as a focusing lens that receives the merged multi-wavelength beams to be focused into a fiber.

The present invention has the following excellent effects.

According to the microlens provided with opposite sides thereof each having an aspheric-surface shape of the present invention, a lens layer having an aspheric-surface shape is provided on each opposite side of the microlens, wherein an optical communication module may be miniaturized and integrated as the working distance WD is minimized to 0.160±0.05 mm, the value obtained by calculating the curvature radius R1 of the first lens layer over the curvature radius R2 of the second lens layer is 1.8 to 3.5, the refractive index Nd is 1.60 to 1.86, the wavelength range of 1290 nm to 1610 nm is available, and the beam divergence angle is 1 mrad or less, thereby having an effect that may exhibit more than 90% collimating performance even when the beam path is 200 mm.

BRIEF DESCRIPTION OF THE DRAWINGS

FIG. 4 is a view showing a result of analyzing collimating performance (i.e., beam divergence angle) according to a refractive index and a curvature radius ratio of the microlens according to the present invention.

FIG. 6 is a view showing a result of analyzing the collimating performance (i.e., beam divergence angle) according to a wavelength of the microlens according to the present invention.

DETAILED DESCRIPTION

Figure 1:
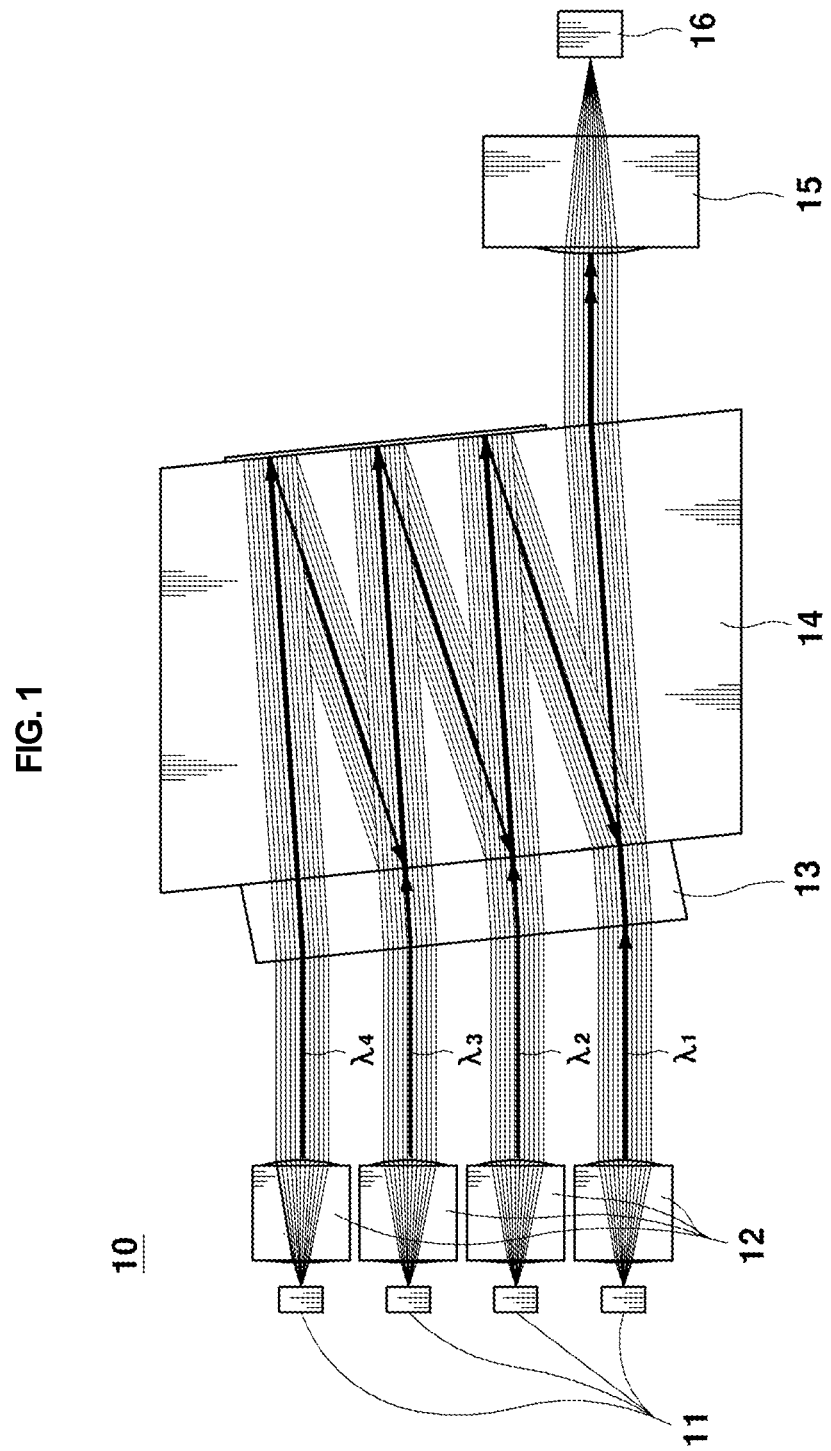
FIG. 1 is a view showing an optical communication module to which a conventional microlens is applied.
Figure 2:
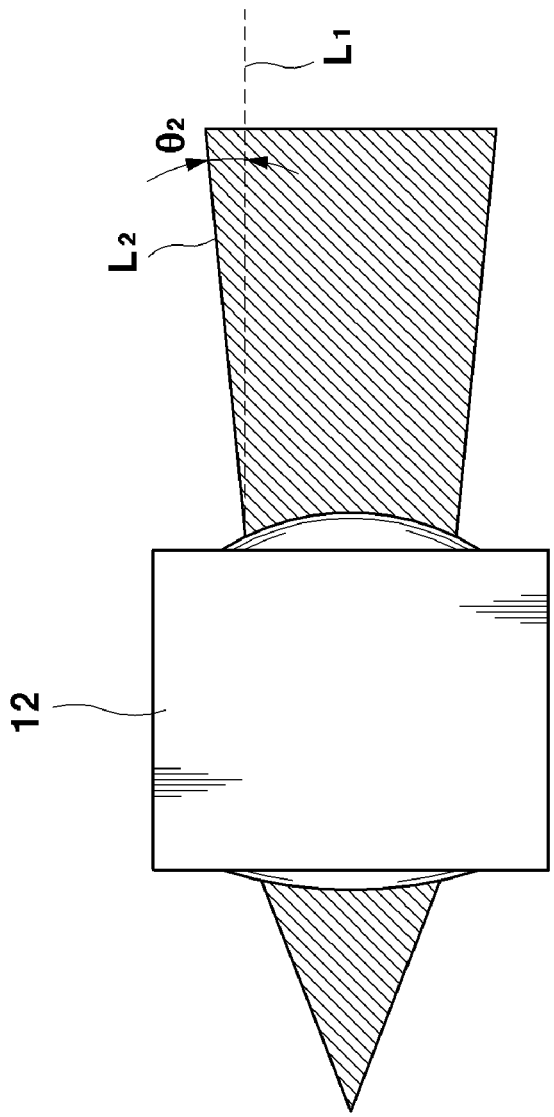
FIG. 2 is a view showing a beam divergence angle of the microlens.

The terms used in the present invention have been selected from general terms that are currently, widely used as much as possible, but in a certain case, there also exists terms that are arbitrarily selected by the applicant. In this case, the meaning should be interpreted by taking into considering the meanings of the terms described or used in the detailed description of the present invention, rather than just by using the names of terms.

Hereinafter, a technical configuration of the present invention will be described in detail with reference to preferred exemplary embodiments illustrated in the accompanying drawings.

However, the present invention is not limited to the exemplary embodiment described herein and may be embodied in other forms. The same reference numerals throughout the specification indicate the same components.

Figure 3:
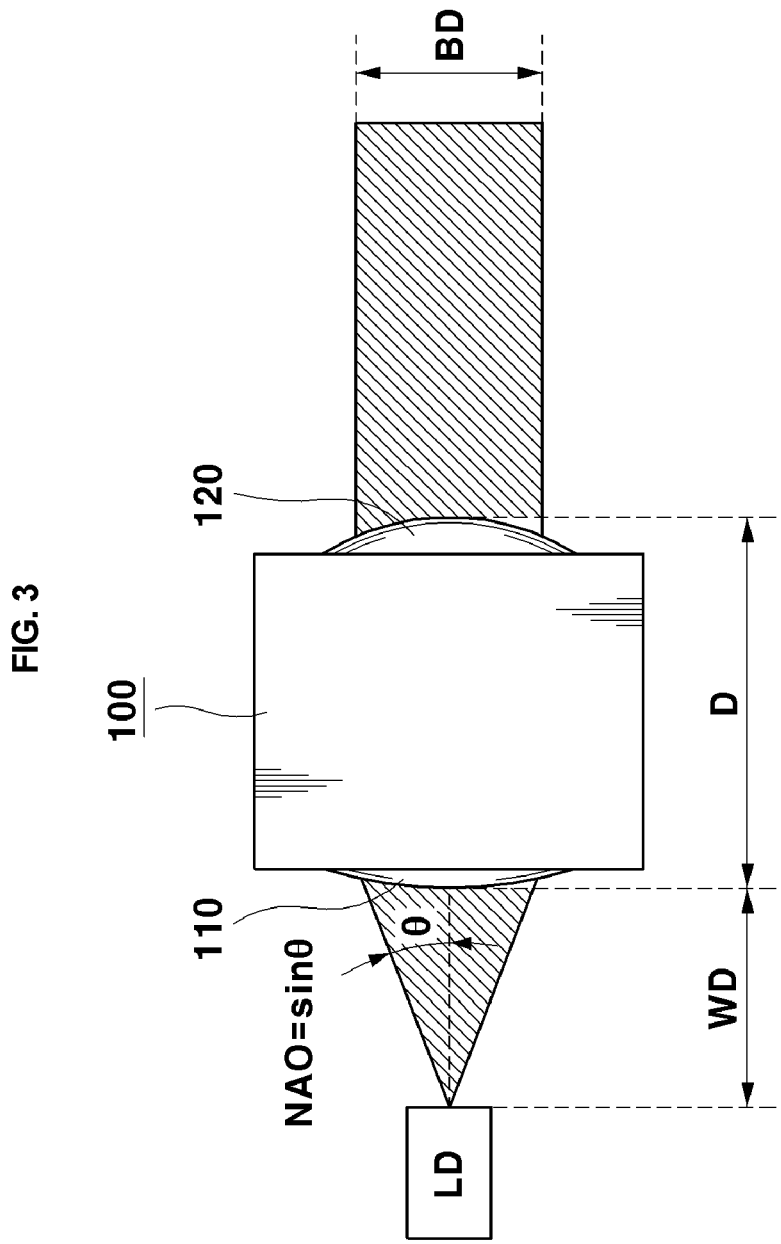
FIG. 3 is a view showing a microlens according to an exemplary embodiment of the present invention.

FIG. 3 is a view showing a microlens according to the exemplary embodiment of the present invention.

Referring to FIG. 3, the microlens 100 according to the exemplary embodiment of the present invention is a microlens that functions as a collimating lens or a focusing lens and is provided with opposite sides thereof each having an aspheric-surface shape, wherein a first lens layer 110 has an aspheric-surface shape on a first side and a second lens layer 120 has an aspheric-surface shape on a second side.

In addition, a working distance WD of the microlens 100 satisfies 0.160±0.05 mm.

In this way, the working distance is minimized, so that the diameter of a beam is reduced, thereby enabling miniaturization and integration of the optical communication module.

In addition, it is preferable that the microlens 100 has a value of 1.8 to 3.5 obtained by calculating a curvature radius R1 of the first lens layer 110 over a curvature radius R2 of the second lens layer 120.

That is, it is designed to satisfy Equation 1 below.

$$R1/R2 = 1.8 \text{ to } 3.5, \quad \text{[Equation 1]}$$

where R1 is the curvature radius of the first lens layer, and R2 is the curvature radius of the second lens layer.

In addition, it is preferable that the microlens 100 has a refractive index Nd of 1.60 to 1.86.

In this way, the microlens 100 is provided to have the value of R1/R2 of 1.8 to 3.5 and the refractive index Nd of 1.60 to 1.86, so that the beam divergence angle is formed to be 1 mrad or less, thereby having an advantage of exhibiting more than 90% collimating performance even when the beam path is 200 mm.

In this case, the microlens 100 may be used in a wavelength range of 1290 nm to 1610 nm.

In addition, the microlens 100 is provided to have a numerical aperture object NAO of 0.50 or less, a thickness D of 0.680 mm to 0.720 mm, and a beam diameter BD of 0.50 mm or less.

Here, the numerical aperture object NAO is calculated as sine, where θ refers to an angle formed by a line parallel to an optical axis and a diffusion line of a light source LD.

Figure 5:
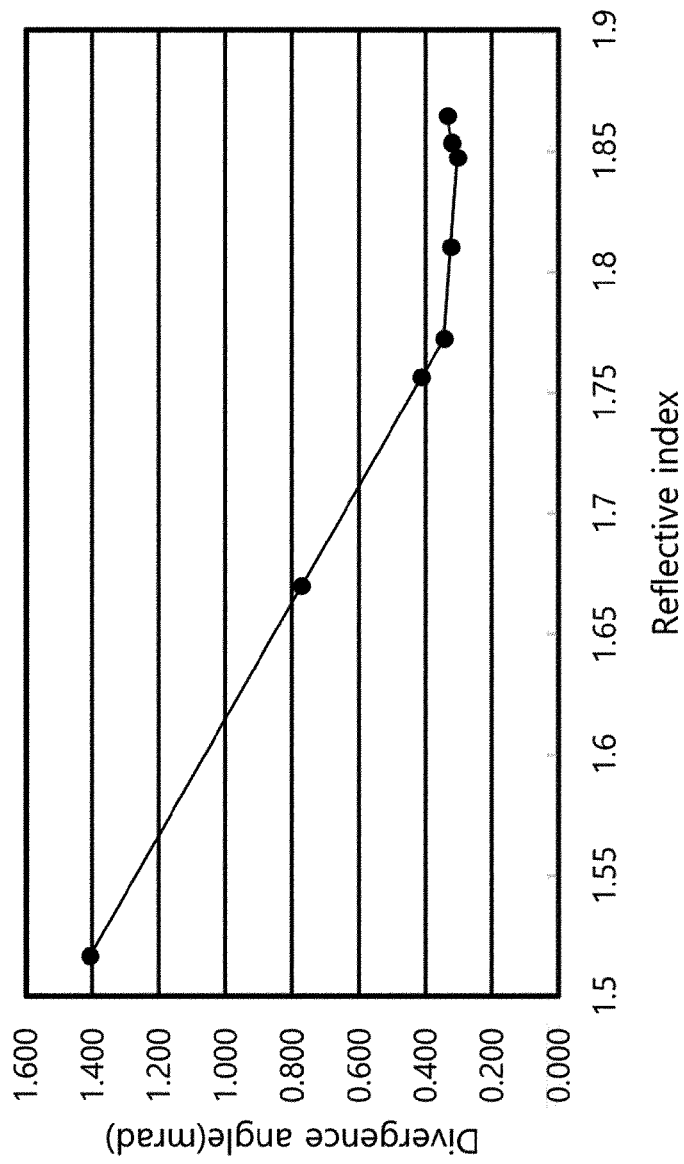
FIG. 5 is a view showing a graph analyzing the collimating performance (i.e., beam divergence angle) according to the refractive index of the microlens according to the present invention.

FIGS. 4 and 5 are views showing results of analyzing the collimating performance (i.e., beam divergence angle) according to the refractive index and curvature radius ratio of the microlens according to the present invention.

Referring to FIGS. 4 and 5, as a result of checking a divergence angle of a beam by fixing a working distance WD to 0.160 mm and making a microlens with various materials (i.e., K-BK7 (SUMITA), K-VC78 (SUMITA), K-VC82 (SUMITA), K-LAFK50 (SUMITA), K-VC89 (SUMITA), L-TIH53 (OHARA), K-VC90 (SUMITA), L-LAH83 (OHARA)) with a refractive index of 1.51633 to 1.864, it is confirmed that the divergence angle of the beam is less than 1 mrad when the refractive index was 1.60 to 1.86.

In addition, when the value of R1/R2 is 2.04 to 3.45, it is confirmed that the divergence angle of the beam is less than 1 mrad.

Figure 7:
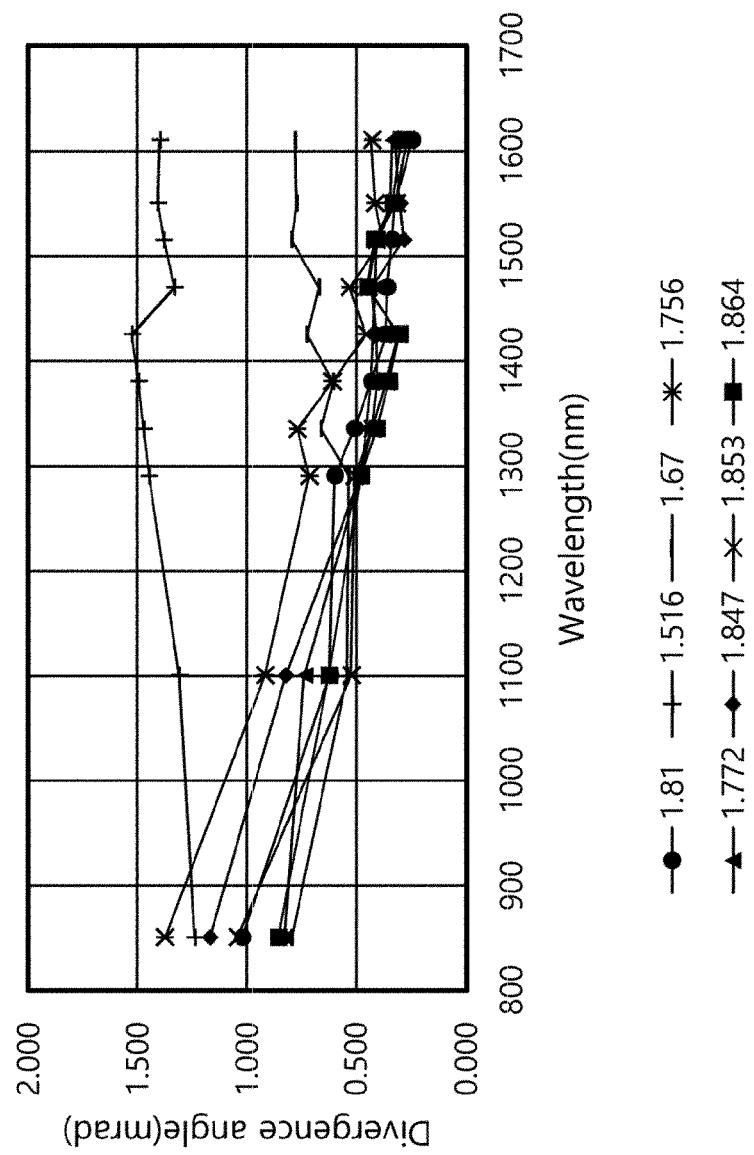
FIG. 7 is a view showing a graph analyzing the collimating performance (i.e., beam divergence angle) according to the wavelength of the microlens according to the present invention.

FIGS. 6 and 7 are views showing results of analyzing the collimating performance (i.e., beam divergence angle) according to the wavelength of the microlens according to the present invention.

Referring to FIGS. 6 and 7, as a result of checking a divergence angle of a beam by fixing the working distance WD to 0.160 mm and making a microlens with various materials (i.e., K-BK7 (SUMITA), K-VC78 (SUMITA), K-VC82 (SUMITA), K-LAFK50 (SUMITA), K-VC89 (SUMITA), L-TIH53 (OHARA), K-VC90 (SUMITA), L-LAH83 (OHARA)) with a refractive index of 1.51633 to 1.864, it is confirmed that the divergence angle of the beam is formed to have less than 1 mrad in the wavelength range of 1290 nm to 1610 nm to which the optical communication module is applied.

In addition, the present invention may be provided as an optical communication module including the microlens 100 according to the present invention.

The optical communication module includes: a plurality of light sources, a plurality of first microlenses (i.e., collimating lenses), a filter, an optical block, and a second microlens (i.e., focusing lens).

Here, the light sources serve to generate beams of different wavelengths, the first microlenses function as collimating lenses for collimating the beams generated from the light sources, and the filter selectively transmits only a specific wavelength of beams incident through the first microlenses.

In addition, the optical block causes the beams of different wavelengths incident through the filter to be reflected and merged with each other, and the second microlens functions as a focusing lens that receives the beams of multiple wavelengths merged through the optical block and focuses the beams into the fiber.

As described above, in the microlens 100 provided with opposite sides thereof each having an aspheric-surface shape according to the present invention, a lens layer having an aspheric-surface shape is provided on each opposite side of the microlens 100, the optical communication module may be miniaturized and integrated as the working distance WD is minimized to 0.160±0.05 mm, the value obtained by calculating the curvature radius R1 of the first lens layer over the curvature radius R2 of the second lens layer is 1.8 to 3.5, the refractive index Nd is 1.60 to 1.86, the wavelength range of 1290 nm to 1610 nm is available, and the beam divergence angle is 1 mrad or less, thereby having an effect that exhibits more than 90% collimating performance even when the beam path is 200 mm.

As described above, the present invention has been illustrated and described with reference to the preferred exemplary embodiment, but is not limited to the above-described exemplary embodiment, and various changes and modifications can be embodied by those skilled in the art to which the present invention belongs without departing from the spirit of the present invention.

What is claimed is:

1. A microlens comprising:
   a first side;
   a second side opposite to the first side;
   a first lens layer having a first aspheric-surface shape provided on the first side; and
   a second lens layer having a second aspheric-surface shape provided on the second side,
   wherein the microlens is configured to deliver a wavelength range of 1290 nm to 1610 nm,
   wherein a working distance (WD) is 0.160±0.05 mm, and a beam divergence angle is less than 1 mrad by satisfying Equation 1:

$$R1/R2 = 1.8 \text{ to } 3.5 \qquad \text{[Equation 1]}$$

where R1 is a curvature radius of the first lens layer, and R2 is a curvature radius of the second lens layer.

2. The microlens of claim 1, wherein the microlens has a refractive index (Nd) of 1.60 to 1.86.

3. The microlens of claim 1, wherein the microlens has a numerical aperture object (NAO) of 0.50 or less.

4. The microlens of claim 1, wherein the microlens has a thickness (D) of 0.680 mm to 0.720 mm, and a beam diameter (BD) of 0.50 mm or less.

5. An optical communication module, comprising:
   a light source;
   the microlens of claim 1 being a first microlens functioning as a collimating lens;
   a filter for selectively transmitting only a specific wavelength of a beam incident through the first microlens;
   an optical block for reflecting beams having different wavelengths incident through the filter to be merged with each other; and
   a second microlens for functioning as a focusing lens that receives the merged multi-wavelength beams to be focused into a fiber.

* * * * *